H. B. KOPF.
PINEAPPLE CRATE.
APPLICATION FILED JULY 24, 1913.
1,112,145.
Patented Sept. 29, 1914.
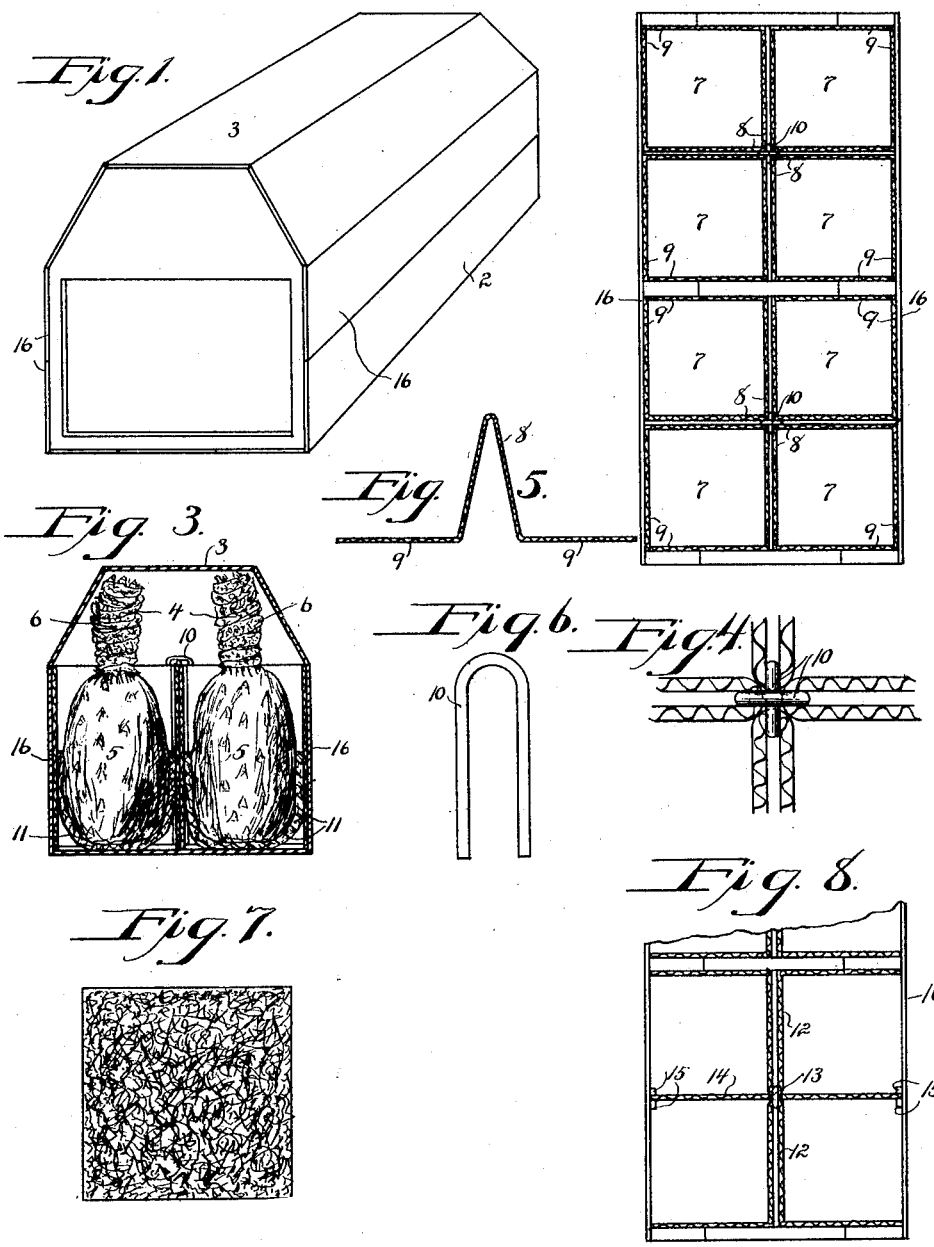

UNITED STATES PATENT OFFICE.

HENRY B. KOPF, OF NEW HAVEN, CONNECTICUT.

PINEAPPLE-CRATE.

1,112,145.  Specification of Letters Patent.  Patented Sept. 29, 1914.

Application filed July 24, 1913. Serial No. 780,908.

*To all whom it may concern:*

Be it known that I, HENRY B. KOPF, a citizen of the United States, residing at New Haven, in the county of New Haven and State of Connecticut, have invented a new and useful Improvement in Pineapple-Crates; and I do hereby declare the following, when taken in connection with the accompanying drawings and the characters of reference marked thereon, to be a full, clear, and exact description of the same, and which said drawings constitute part of this application, and represent, in—

Figure 1 a perspective view of a pineapple-crate constructed in accordance with my invention. Fig. 2 a plan view thereof with its contracted top removed. Fig. 3 a view thereof in transverse section, showing two pineapples in position. Fig. 4 a broken plan view showing, on an enlarged scale, the method of putting the ends of the folds of the partitions together at the top and bottom of the crate. Fig. 5 a detached plan view of one of the partitions partly open. Fig. 6 a view in elevation of one of the clamps. Fig. 7 a plan view of one of the bottom pads. Fig. 8 a broken plan view of one of the modified forms which my improvement may assume, only two folded partitions being in this instance employed.

My invention relates to an improvement in pineapple-crates, the object being to produce a compact, convenient and strong crate designed with particular reference to enabling a grower of pineapples to ship plant-ripened fruit to distant points in such a way that it may arrive in absolutely sound condition. It is necessary that pineapples should ripen on the plant to achieve their highest flavor and also to avoid the sanitary objection, now being so generally pressed, to fruit picked green and artificially ripened.

With these ends in view my invention consists in a pineapple-crate having certain details of construction and combinations of parts as will be hereinafter described and pointed out in the claims.

In carrying out my invention as herein shown, I employ an oblong box 2 made of wood and having a contracted top 3 for the better confinement of the crowns 4 of the pineapples 5, the crowns being provided with collars 6 of excelsior or other suitable material applied so as to prevent them from breaking down and thus reaching the market in a crushed condition. As herein shown, the crate is designed to receive eight pineapples of the size known as "eights," but it will be understood, of course, that crates on the same principle will be made to receive a larger or smaller number of pineapples, according to the size of the fruit.

For each pine apple, I provide a separate compartment 7, these compartments being formed by the employment of folded partitions made by preference of corrugated cardboard and each comprising a central fold or loop 8 and two lateral arms 9, located in line and corresponding in length to the length of the loop. These partitions are assembled in sets of four, so that the bends of the loops abut against each other, as shown in Figs. 2 and 4 of the drawings, the abutting ends of the loops being clamped together by means of wire staple-like clamps 10 applied at the upper and lower edges of the abutting loops which are arranged parallel with the bottom of the box so that their open sides, as it were, are exposed at the top for the insertion of the legs of the clamps at their bends. I do not, however, limit myself to anchoring the loops together by means of clamps, as they might be effectively sewed together. Each of the compartments 7 has crowded into it a bottom-pad 11 consisting, by preference and as shown, of a square pad made of excelsior or other equivalent yielding material, the edges of the pad rising upon the side walls of the compartment so as to constitute a cushion for the entire butt of each pine apple as shown in Fig. 3. The pineapples having been inserted into the compartment 7, their crowns 4 are provided with collars 6 after which the contracted top 3 of the crate is applied, whereby the fruit is prevented from either lateral or endwise displacement and whereby its reaching the market in absolutely sound condition is secured since there is no opportunity for any of the displacement of the fruit which results in bruises.

In the modified construction shown in Fig. 8 of the drawings, four compartments are secured by the employment of two folded corrugated cardboard partitions 12 having their abutting folds coupled together by means of a clamp 13, and employed in conjunction with a single cardboard partition 14 passing between the abutting ends of the loops at a right angle thereto, and having its ends secured in place by cleats 15 applied to the inner faces of the side walls 16 of the crate, which in this form may be made at a slightly reduced cost over the preferred form heretofore described.

I claim:—

1. In a pineapple crate, the combination with a box, of partitions therefor each consisting of a length of cardboard folded to form a loop, and one or more lateral arms, the said partitions being assembled in the box at a right angle to the bottom of the box with the loops in abutment, and clamps applied to the abutting bends of the loops into which the legs of the clamps are inserted at a right angle to the plane of the bottom of the box.

2. In a pineapple crate, the combination with a box, of four partitions each consisting of a length of cardboard folded to form a loop, and two lateral arms the said partitions being assembled in the box at a right angle to the bottom thereof with the bends of the loops in abutment, and two clamps crossed with respect to each other and having their legs inserted into the bends of the loops and extending at a right angle to the bottom of the box.

3. In a pineapple crate, the combiantion with a box, of a plurality of cardboard partitions each having a central loop flanked by laterally extending arms, the said partitions being symmetrically assembled in the box at a right angle to the bottom thereof with the bends of the loops in abutment, means for securing the abutting bends of the loops together, and cup-shaped cushions respectively introduced into the bottoms of the compartments formed by the partitions.

In testimony whereof, I have signed this specification in the presence of two subscribing witnesses.

HENRY B. KOPF.

Witnesses:
CLARA L. WEED,
M. P. NICHOLS.

Copies of this patent may be obtained for five cents each, by addressing the "Commissioner of Patents, Washington, D. C."